United States Patent
Chen et al.

(10) Patent No.: US 9,794,105 B2
(45) Date of Patent: Oct. 17, 2017

(54) SIGNAL TRANSMITTING APPARATUS AND SIGNAL TRANSMITTING METHOD

(71) Applicant: MediaTek Singapore Pte. Ltd., Singapore (SG)

(72) Inventors: Hsin-Hung Chen, Hsinchu (TW); Manel Collados Asensio, Aylesford (GB); Wei-Kai Chang, Taipei (TW); Qian-Zhi Huang, Hsinchu (TW); Chi-Tsan Chen, Taichung (TW); Jun Hu, Hangzhou (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/115,272

(22) PCT Filed: Jan. 16, 2015

(86) PCT No.: PCT/CN2015/070871
§ 371 (c)(1),
(2) Date: Jul. 29, 2016

(87) PCT Pub. No.: WO2016/112532
PCT Pub. Date: Jul. 21, 2016

(65) Prior Publication Data
US 2017/0180181 A1    Jun. 22, 2017

(51) Int. Cl.
*H04L 27/36* (2006.01)
*H04B 1/04* (2006.01)

(52) U.S. Cl.
CPC ............. *H04L 27/368* (2013.01); *H04B 1/04* (2013.01); *H04B 2001/0425* (2013.01)

(58) Field of Classification Search
CPC ... H04L 27/368; H04L 27/367; H03F 1/3247; H03F 2201/3233

(Continued)

(56) References Cited

U.S. PATENT DOCUMENTS

| 8,204,456 | B2 | 6/2012 | Xu | |
|---|---|---|---|---|
| 2005/0141637 | A1* | 6/2005 | Domokos | H03F 1/3294 375/296 |

(Continued)

FOREIGN PATENT DOCUMENTS

| CN | 104267385 A | 1/2015 |
|---|---|---|
| EP | 2 515 444 A1 | 10/2012 |

(Continued)

OTHER PUBLICATIONS

"International Search Report" mailed on Sep. 9, 2015 for International application No. PCT/CN2015/070871, International filing date:Jan. 16, 2015.

*Primary Examiner* — Emmanuel Bayard
(74) *Attorney, Agent, or Firm* — Winston Hsu

(57) ABSTRACT

A signal transmitting apparatus includes: a first converting device arranged to generate an up-converted in-phase signal according to an in-phase digital signal and a first pre-distortion signal; a second converting device arranged to generate an up-converted quadrature signal according to a quadrature digital signal and a second pre-distortion signal; an amplifying device arranged to generate an amplified signal according to the up-converted in-phase signal and the up-converted quadrature signal; and a processing device arranged to generate the first pre-distortion signal according to a first combination signal combined by a cube of the in-phase digital signal and a multiplication of the in-phase digital signal and a square of the quadrature digital signal, and to generate the second pre-distortion signal according to a second combination signal combined by a cube of the quadrature digital signal and a multiplication of the quadrature digital signal and a square of the in-phase digital signal.

34 Claims, 4 Drawing Sheets

(58) Field of Classification Search
USPC .................................................. 375/295–297
See application file for complete search history.

(56) References Cited

U.S. PATENT DOCUMENTS

| | | | | |
|---|---|---|---|---|
| 2005/0157815 A1* | 7/2005 | Kim | ....................... | H03D 3/008 |
| | | | | 375/302 |
| 2006/0240786 A1 | 10/2006 | Liu | | |
| 2015/0054585 A1* | 2/2015 | Chang | ....................... | H03F 3/19 |
| | | | | 330/291 |

FOREIGN PATENT DOCUMENTS

| | | |
|---|---|---|
| EP | 2 779 440 A2 | 9/2014 |
| EP | 2 876 852 A1 | 5/2015 |
| GB | 2 339 657 A | 2/2000 |

* cited by examiner

SIGNAL TRANSMITTING APPARATUS AND SIGNAL TRANSMITTING METHOD

TECHNICAL FIELD

The present invention relates to a signal transmitting apparatus and method thereof, and more particularly to a pre-distortion method to reduce the power of CIM3 signal of a signal transmitting apparatus.

BACKGROUND

In a wireless communications system, the transmitter is used to transmit a wireless signal to the target receiver. When the power of wireless signal is larger, the transmission range is longer. Meanwhile, when the bandwidth of wireless signal is wider, the transmission rate is higher. However, the non-linear characteristic of the transmitter may cause some problems to the wireless system when the power and bandwidth of wireless signal are higher. For the example of LTE (Long Term Evolution) wireless system, a passive mixer is normally used to un-convert the wireless signal into an RF (Radio Frequency) signal, and a programmable gain amplifier or a power amplifier is used to power-up the RF signal for transmission. However, the non-linear characteristic of the passive mixer may introduce distortion around the frequency of the carrier frequency, i.e. the so called in-band distortion. Meanwhile, the passive mixer also generates harmonic signals at the $3^{rd}$ harmonic frequency of the carrier frequency. Then, the non-linearity of the amplifier may fold the higher order harmonic signals back to the $1^{st}$ order frequency (i.e. the carrier frequency) of the wireless signal, i.e. the so called CIM3 (Counter $3^{rd}$ order intermodulation) folding back distortion. As a result, the power-up RF signal is distorted. Moreover, when the data rate of the wireless signal is reduced, e.g. only a partial RB (Resource Block) are used to transmit data, the CIM3 effect is more severe, and the CIM3 signal may affect the adjacent channels nearby the channel of the LTE wireless system. Therefore, how to reduce the effects caused by the non-linear characteristic of a wireless transmitter is an urgent problem in this field.

SUMMARY

One of the objectives of the present invention is to provide a pre-distortion method to reduce the power of CIM3 signal of a signal transmitting apparatus.

According to a first embodiment of the present invention, a signal transmitting apparatus is disclosed. The signal transmitting apparatus comprises a first converting device, a second converting device, an amplifying device, and a processing device. The first converting device is arranged to generate an up-converted in-phase signal according to an in-phase digital signal and a first pre-distortion signal. The second converting device is arranged to generate an up-converted quadrature signal according to a quadrature digital signal and a second pre-distortion signal. The amplifying device is arranged to generate an amplified signal according to the up-converted in-phase signal and the up-converted quadrature signal. The processing device is arranged to generate the first pre-distortion signal at least according to a first combination signal combined by a cube of the in-phase digital signal and a multiplication of the in-phase digital signal and a square of the quadrature digital signal, and to generate the second pre-distortion signal at least according to a second combination signal combined by a cube of the quadrature digital signal and a multiplication of the quadrature digital signal and a square of the in-phase digital signal.

According to a second embodiment of the present invention, a signal transmitting method is disclosed. The signal transmitting method comprises the steps of: generating an up-converted in-phase signal according to an in-phase digital signal and a first pre-distortion signal; generating an up-converted quadrature signal according to a quadrature digital signal and a second pre-distortion signal; generating an amplified signal according to the up-converted in-phase signal and the up-converted quadrature signal; generating the first pre-distortion signal at least according to a first combination signal combined by a cube of the in-phase digital signal and a multiplication of the in-phase digital signal and a square of the quadrature digital signal; and generating the second pre-distortion signal at least according to a second combination signal combined by a cube of the quadrature digital signal and a multiplication of the quadrature digital signal and a square of the in-phase digital signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
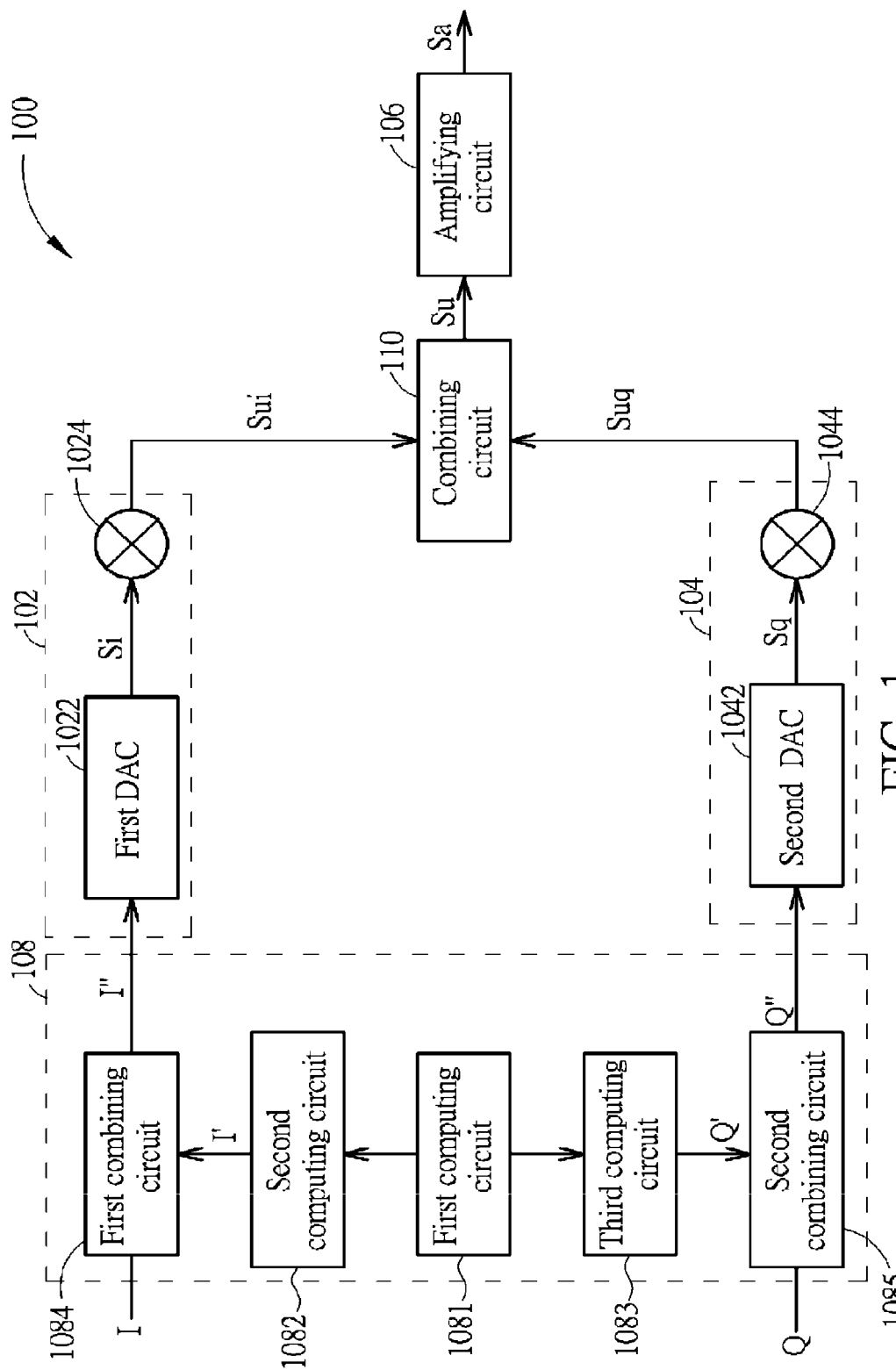
FIG. 1 is a diagram illustrating a first signal transmitting apparatus according to an embodiment of the present invention.

Please refer to FIG. 1, which is a diagram illustrating a first signal transmitting apparatus 100 according to an embodiment of the present invention. The signal transmitting apparatus 100 comprises a first converting device 102, a second converting device 104, an amplifying device 106, and a processing device 108. The first converting device 102 is arranged to generate an up-converted in-phase signal Sui according to an in-phase digital signal I and a first pre-distortion signal I'. The second converting device 104 is arranged to generate an up-converted quadrature signal Suq according to a quadrature digital signal Q and a second pre-distortion signal Q'. The amplifying device 106 may be a programmable gain amplifier or a power amplifier. The amplifying device 106 is arranged to generate an amplified signal Sa according to the up-converted in-phase signal Sui and the up-converted quadrature signal Suq. The processing device 108 is arranged to generate the first pre-distortion signal I' at least according to a first combination signal combined by a cube (i.e. $I^3$) of the in-phase digital signal I and a multiplication (i.e. $I \cdot Q^2$) of the in-phase digital signal I and a square (i.e. $Q^2$) of the quadrature digital signal Q, and to generate the second pre-distortion signal Q' at least according to a second combination signal combined by a cube (i.e. $Q^3$) of the quadrature digital signal Q and a multiplication (i.e. $Q \cdot I^2$) of the quadrature digital signal Q and a square of the in-phase digital signal (i.e. $I^2$).

More specifically, the processing device 108 generates the first combination signal (i.e. $I^3 - 3I \cdot Q^2$) by subtracting a triple (i.e. $3I \cdot Q^2$) of the multiplication of the in-phase digital signal I and the square of the quadrature digital signal Q from the cube of the in-phase digital signal I, and generates the second combination signal (i.e. $Q^3 - 3Q \cdot I^2$) by subtracting a triple (i.e. $3Q \cdot I^2$) of the multiplication of the quadrature digital signal Q and the square of the in-phase digital signal I from the cube of the quadrature digital signal Q. According to the embodiment of the present invention, the processing device 108 further multiplies the first combination signal by a compensation coefficient α to generate the first pre-distortion signal I', and multiplies the second combination signal by the compensation coefficient α to generate the second pre-distortion signal Q'. Then, the processing device 108 further shifts the first combination signal by a compensation phase φ to generate the first pre-distortion signal I', and shifts the second combination signal by the compensation phase φ to generate the second pre-distortion signal Q'.

Accordingly, the pre-distorted in-phase digital signal I" and the pre-distorted quadrature digital signal Q" outputted by the processing device 108 can be expressed by the following equations (1) and (2) respectively:

$$I''=I+I', \qquad (1)$$

$$Q''=Q+Q'. \qquad (2)$$

According to the above embodiment, to generate the first pre-distortion signal I' and the second pre-distortion signal Q', the processing device 108 comprises a first computing circuit 1081, a second computing circuit 1082, a third computing circuit 1083, a first combining circuit 1084, and a second combining circuit 1085. The first computing circuit 1081 is arranged to generate a first signal term (i.e. $\alpha(I^3 - 3I \cdot Q^2)$) and a second signal term (i.e. $\alpha(Q^3 - 3Q \cdot I^2)$) according to the in-phase digital signal I, the quadrature digital signal Q, and the compensation coefficient α. The second computing circuit 1082 is arranged to shift the first signal term by the compensation phase φ to generate the first pre-distortion signal I'. The third computing circuit 1083 is arranged to generate shift the second signal term by the compensation phase φ to generate the second pre-distortion signal Q'. The first combining circuit 1084 is arranged to combine the in-phase digital signal I and the first pre-distortion signal I' to generate the pre-distorted in-phase digital signal I". The second combining circuit 1085 is arranged to combine the quadrature digital signal Q and the second pre-distortion signal Q' to generate the pre-distorted quadrature digital signal Q".

In addition, the first converting device 102 comprises a first digital-to-analog converting circuit (DAC) 1022 and a first mixing circuit 1024. The first mixing circuit 1024 may be a passive mixer. The first digital-to-analog converting circuit 1022 is arranged to convert the pre-distorted in-phase digital signal I" into a pre-distorted in-phase analog signal Si. The first mixing circuit 1022 arranged to up-convert the pre-distorted in-phase analog signal Si into the up-converted in-phase signal Sui. The second converting device 104 comprises a second digital-to-analog converting circuit 1042 and a second mixing circuit 1044. The second mixing circuit 1044 may be a passive mixer. The second digital-to-analog converting circuit (DAC) 1042 is arranged to convert the pre-distorted quadrature digital signal Q" into a pre-distorted quadrature analog signal Sq. The second mixing circuit 1044 is arranged to up-convert the pre-distorted quadrature analog signal Sq into the up-converted quadrature signal Suq. According to the embodiment, the signal transmitting apparatus 100 further comprises a combining circuit 110. The combining circuit 110 is arranged to combine the up-converted in-phase signal Sui and the up-converted quadrature signal Suq into an up-converted signal Su. The amplifying device 106 generates the amplified signal Sa according to the up-converted signal Su.

It should be noted that the compensation coefficient α and the compensation phase φ may be stored in the first computing circuit 1081 or stored in another storing circuit (not shown) in the signal transmitting apparatus 100.

According to embodiment, the first pre-distortion signal I' and the second pre-distortion signal Q' are arranged to pre-distort or calibrate the in-phase digital signal I and the quadrature digital signal Q respectively such that the power of CIM3 (Cross $3^{rd}$ order intermodulation) signal or out-of-band $3^{rd}$ order intermodulation (OB-IM3) in the amplified signal Sa can be reduced or diminished to an acceptable level. It is noted that the CIM3 or OB-IM3 signal is emerged due to the non-linear characteristic of the first mixing circuit 1024, the second mixing circuit 1044, and the amplifying device 106. More specifically, according to the embodiment, the digital baseband data is z, and the digital baseband data z can be expressed by the following equation (3):

$$z=I+jQ=\gamma e^{j\omega m}. \qquad (3)$$

I is the in-phase digital signal, and Q is the quadrature digital signal. Then, the modulating output signal of the first mixing circuit 1024 and the second mixing circuit 1044 (i.e. the up-converted signal Su) can be expressed by the following equation (4):

$$x=Re[ze^{j\omega}+\beta \cdot z^*e^{j3\omega}]=Re[ze^{j\omega}+me^{j3\omega}]=\frac{1}{2}[ze^{j\omega}+z^*e^{-j\omega}+me^{j3\omega}+m^*e^{-j3\omega}]. \qquad (4)$$

ω is the oscillating frequency of the oscillation signal inputting to the first mixing circuit 1024 and the second mixing circuit 1044 for up-converting the pre-distorted in-phase analog signal Si and the pre-distorted quadrature analog signal Sq respectively. The amplified output signal y of the amplifying device 106 (i.e. the amplified signal Sa) can be expressed by the following equation (5):

$$y=\alpha_1 x+\alpha_3 x^3. \qquad (5)$$

If the equation (4) is substituted into equation (5), then the signal term at the frequency ω produced by $x^3$ can be expressed by the following equation (6):

$$x^3 @\omega:(2|z|^2+6|m|^2)z+3mz^{*2}+(z^2+2|m|^2)z^*. \qquad (6)$$

If m=βz*, then the above equation (6) can be expressed by the following equation (7):

$$m=\beta z^*:(3+6|\beta|^2)|z|^2z+3\beta z^{*3}. \quad (7)$$

If $z=\gamma e^{j\omega_m}$, then the above equation (7) can be expressed by the following equation (8):

$$z=\gamma e^{j\omega_m}:(3+6|\beta|^2)|\gamma|^2\gamma e^{j\omega_m}+3\beta\gamma^{*3}e^{j3\omega_m}. \quad (8)$$

If z*=(I−jQ), then the term $3\beta z^{*3}$ in equation (7) can be expressed by the following equation (9):

$$3\beta z^{*3}=3\beta(I-jQ)^3=3\beta(I^3-3IQ^2+j(Q^3-3I^2Q)). \quad (9)$$

According to the above equation (9), it can be seen that the term $3\beta(I^3-3IQ^2)$ can be regarded as the in-phase CIM3 signal appearing in the in-band of the amplified signal Sa, and the term $3\beta(Q^3-3I^2Q)$ can be regarded as the quadrature CIM3 signal appearing in the in-band of the amplified signal Sa. Therefore, to reduce the CIM3 signal of the amplified signal Sa, the present first computing circuit 1081 is arranged to pre-distort the in-phase digital signal I by the first pre-distort signal (i.e. $\alpha(I^3-3I\cdot Q^2)$), and to pre-distort quadrature digital signal Q by the second pre-distort signal (i.e. $\alpha(Q^3-3Q\cdot I^2)$) as shown in FIG. 1.

In addition, when the mixer (i.e. the first mixing circuit 1024 and the second mixing circuit 1044) up-converts the pre-distorted in-phase analog signal Si and the pre-distorted quadrature analog signal Sq by the local oscillation signal, the phase of the $3^{rd}$ order harmonic signal induced by the mixer is not exactly triple of the phase of the $1^{st}$ order local oscillation signal. The phase of the $3^{rd}$ order harmonic signal may be shifted by a phase difference, i.e. phase shift. If the $3^{rd}$ order harmonic signal has phase shift, the above-mentioned CIM3 signal may also be shifted by the same phase shift. In other words, the first pre-distort signal $\alpha(I^3-3I\cdot Q^2)$ and the second pre-distort signal $\alpha(Q^3-3Q\cdot I^2)$ should be phase-shifted by an appropriate phase (i.e. ϕ) by the second computing circuit 1082 and the third computing circuit 1083 before combining with the in-phase digital signal I and the quadrature digital signal Q respectively.

More specifically, if the digital baseband data BB is expressed by the following equation (10):

$$BB=A_m e^{j\omega_m t}, \quad (10)$$

and the local oscillation signal, which controls the mixer (i.e. the first mixing circuit 1024 and the second mixing circuit 1044), having a phase shift is expressed by the following equation (11):

$$LO=e^{j\omega_c t}+\beta e^{-j(3\omega_c t+\theta)}, \quad (11)$$

then the modulating output signal of the first mixing circuit 1024 and the second mixing circuit 1044 (i.e. the up-converted signal Su) can be expressed by the following equation (12):

$$MOD=Re[A_m e^{j(\omega_c+\omega_m)t}+A_m\beta e^{j((3\omega_c-\omega_m)t-\theta)}]=A_m \cos(\omega_c+\omega_m)t+A_m\beta\cos((3\omega_c-\omega_m)t-\theta). \quad (12)$$

The amplified output signal y of the amplifying device 106 (i.e. the amplified signal Sa) can be expressed by the following equation (13):

$$RF_{NL}: y = \gamma_1 x + \gamma_3 x^3 = \quad (13)$$
$$\gamma_1(A_m\cos(\omega_c+\omega_m)t + A_m\beta\cos((3\omega_c-\omega_m)t-\phi))+$$
$$\gamma_3(A_m\cos(\omega_c+\omega_m)t + A_m\beta\cos((3\omega_c-\omega_m)t-\phi))^3) =$$

-continued $$\left(\gamma_1 A_m + \frac{3\gamma_3 A_m^3}{4} + \frac{3\gamma_3 A_m^3\beta^3}{4}\right)\cos(\omega_c+\omega_m)t +$$
$$\frac{3\beta\gamma_3 A_m^3}{4}\cos((\omega_c-3\omega_m)t-\phi).$$

It can be seen that, in the above equation (13), the same phase shift Φ will appear in the frequency ($\omega_c-3\omega_m$), which is the frequency of the CIM3 signal of the amplified signal Sa. Therefore, to precisely reduce the power of the CIM3 signal of the amplified signal Sa, the present second computing circuit 1082 is arranged to shift the first pre-distort signal (i.e. $\alpha(I^3-3I\cdot Q^2)$) by an appropriate phase (i.e. ϕ) before inputting to the first combining circuit 1084, and the third computing circuit 1083 is arranged to shift the second pre-distort signal (i.e. $\alpha(Q^3-3Q\cdot I^2)$) by the appropriate phase (i.e. ϕ) before inputting to the second combining circuit 1085 as shown in FIG. 1.

Figure 2:
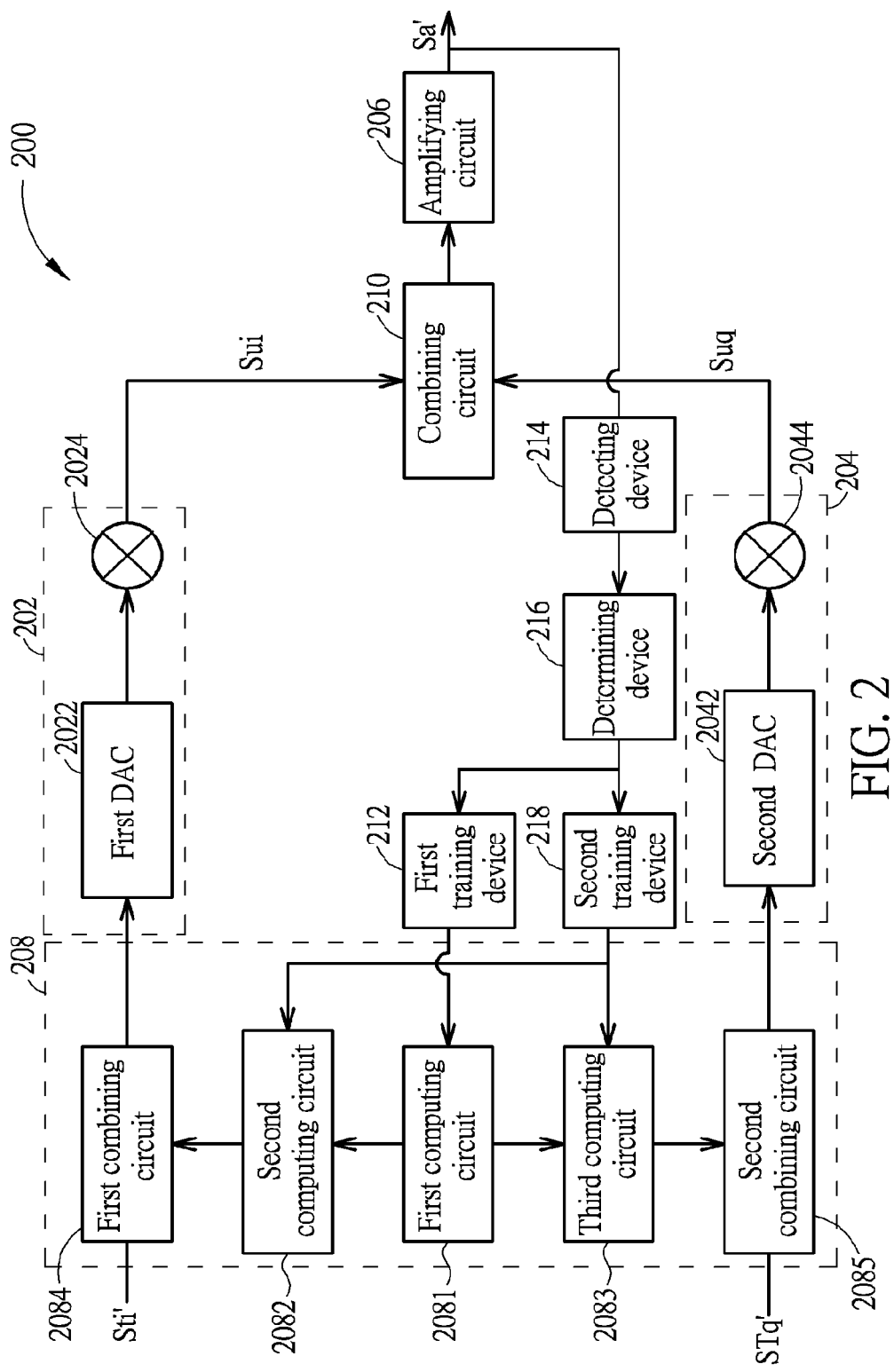
FIG. 2 is a diagram illustrating a signal transmitting apparatus according to a second embodiment of the present invention.

According to the above description, the compensation coefficient α and the compensation phase ϕ are the two critical values need to be determined before the signal transmitting apparatus 100 transmits the real data to the receiver. FIG. 2 is a diagram illustrating a signal transmitting apparatus 200 according to a second embodiment of the present invention. The signal transmitting apparatus 200 comprises a calibration mechanism to determine the compensation coefficient α and the compensation phase ϕ. The signal transmitting apparatus 200 comprises a first converting device 202, a second converting device 204, an amplifying device 206, a processing device 208, a combining circuit 210, a first training device 212, a detecting device 214, a determining device 216, and a second training device 218. The first converting device 202 comprises a first digital-to-analog converting circuit 2022 and a first mixing circuit 2024. The second converting device 204 comprises a second digital-to-analog converting circuit 2042 and a second mixing circuit 2044. The processing device 208 comprises a first computing circuit 2081, a second computing circuit 2082, a third computing circuit 2083, a first combining circuit 2084, and a second combining circuit 2085. The first training device 212, the detecting device 214, the determining device 216, and the second training device 218 are configured as the calibration device for determining the compensation coefficient α and the compensation phase ϕ. It should be noted that the first converting device 202, the second converting device 204, the amplifying device 206, the processing device 208, and the combining circuit 210 are similar to the first converting device 102, the second converting device 104, the amplifying device 106, the processing device 108, and the combining circuit 110 respectively, thus the detailed description of the above deices is omitted here for brevity.

According to the second embodiment, the first training device 212 is arranged to control the first computing circuit 2081 to sweep the compensation coefficient α by a predetermined coefficient range to accordingly generate the amplified signal Sa'. The detecting device 214 is arranged to detect a power of a CIM3 (Counter inter-modulation signal) in the amplified signal Sa'. The determining device 216 is arranged to determine a specific coefficient from the predetermined coefficient range, wherein the specific coefficient corresponds to a specific power of the CIM3 signal in the amplified signal Sa'. The second training device 218 is arranged to control the second computing circuit 2082 and the third computing circuit 2083 to sweep the compensation phase φ by a predetermined phase range to accordingly generate the amplified signal Sa', and the determining device 216 is arranged to further determine a specific phase from the predetermined phase range, and the specific phase corresponds to the specific power of the CIM3 signal in the amplified signal Sa'. According to the embodiment, the specific power is a power lower than a threshold power. When the specific coefficient and the specific phase are determined, the specific coefficient and the specific phase can be set to be the compensation coefficient α and the compensation phase φ respectively.

More specifically, to determine the target compensation coefficient α and the target compensation phase φ, a testing signals Sti', Stq' is arranged to input to the processing device 208, and the calibration device sweeps the coefficient and the phase to find the appropriate coefficient and phase such that the power of the CIM3 signal in the amplified signal Sa' is low enough (i.e. lower than a predetermined threshold power) for the system. According to the embodiment, the testing signals Sti', Stq' may be a one-tone signal or a modulation signal. For example, the testing signals Sti', Stq' may be a LTE modulation signal with one RB.

Figure 3:
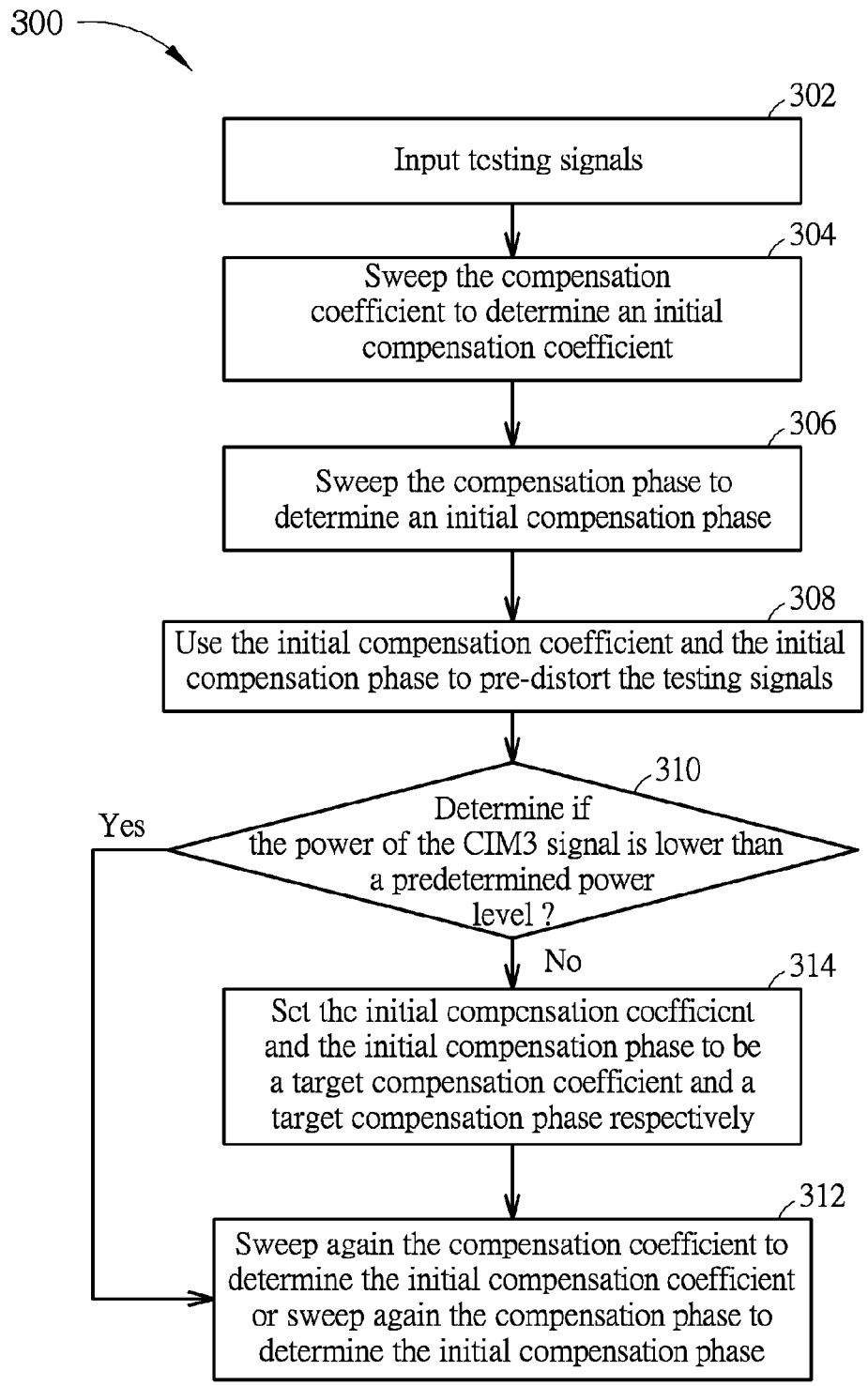
FIG. 3 is a flowchart illustrating a calibration process performed by a signal transmitting apparatus to determine a target compensation coefficient and a target compensation phase according to an embodiment of the present invention.

Please refer to FIG. 3, which is a flowchart illustrating a calibration process 300 performed by the signal transmitting apparatus 200 to determine the target compensation coefficient α and the target compensation phase φ according to an embodiment of the present invention. Provided that substantially the same result is achieved, the steps of the flowchart shown in FIG. 3 need not be in the exact order shown and need not be contiguous; that is, other steps can be intermediate. The calibration process 300 comprises:

Step 302: Input the testing signals Sti', Stq' to the processing device 208;

Step 304: Use the second training device 212 to control the first computing circuit 2081 to sweep the compensation coefficient by a predetermined coefficient range, use the detecting device 214 to detect the power of the CIM3 signal in the amplified signal Sa', and use the determining device 216 to determine an initial compensation coefficient from the predetermined coefficient range in which the initial compensation coefficient corresponds to the minimum power of the CIM3 signal in the amplified signal Sa';

Step 306: Use the second training device 218 to control the second computing circuit 2082 and the third computing circuit 2083 to sweep the compensation phase by a predetermined phase range, use the detecting device 214 to detect the power of the CIM3 signal in the amplified signal Sa', and use the determining device 216 to determine an initial compensation phase from the predetermined phase range in which the initial compensation phase corresponds to the minimum power of the CIM3 signal in the amplified signal Sa';

Step 308: Use the initial compensation coefficient and the initial compensation phase to pre-distort the testing signals Sti', Stq' to generate the amplified signal Sa';

Step 310: Determine if the power of the CIM3 signal in the amplified signal Sa' lower than a predetermined power level, if yes, go to step 312, if no, go to step 314;

Step 312: Set the initial compensation coefficient and the initial compensation phase to be the target compensation coefficient α and the target compensation phase φ respectively;

Step 314: Use the second training device 212 to control the first computing circuit 2081 to sweep again the compensation coefficient by the predetermined coefficient range, use the detecting device 214 to detect the power of the CIM3 signal in the amplified signal Sa', and use the determining device 216 to determine the initial compensation coefficient from the predetermined coefficient range in which the initial compensation coefficient corresponds to the minimum power of the CIM3 signal in the amplified signal Sa'; or use the second training device 218 to control the second computing circuit 2082 and the third computing circuit 2083 to sweep gain the compensation phase by the predetermined phase range, use the detecting device 214 to detect the power of the CIM3 signal in the amplified signal Sa', and use the determining device 216 to determine the initial compensation phase from the predetermined phase range in which the initial compensation phase corresponds to the minimum power of the CIM3 signal in the amplified signal Sa', go to step 312.

Figure 4:
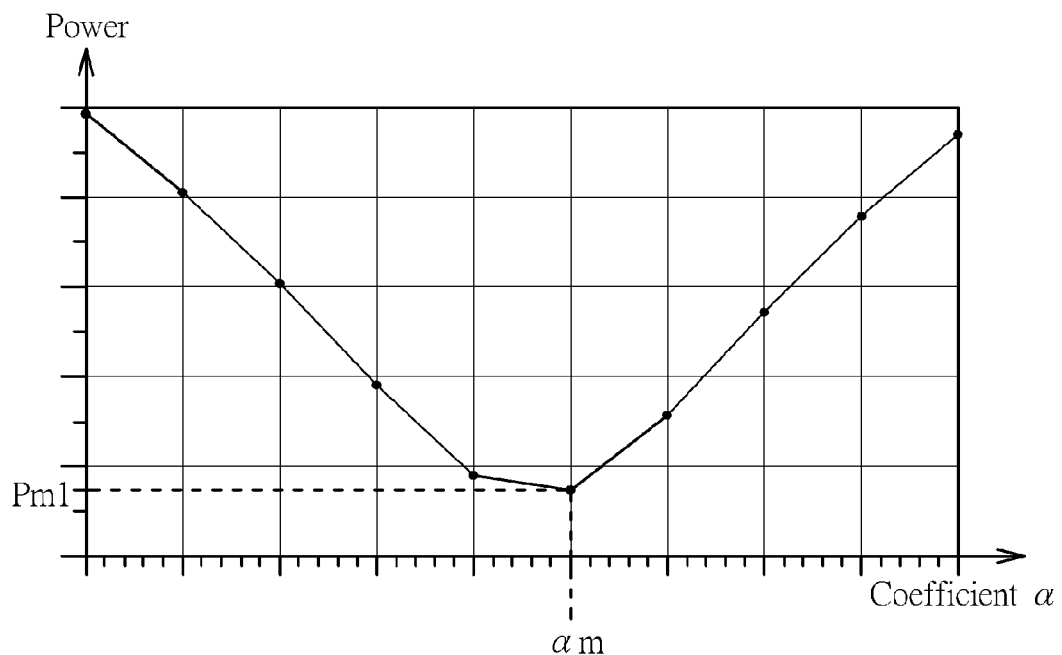
FIG. 4 is a diagram illustrating the power of CIM3 signal versus the predetermined coefficient range and the predetermined phase range according to an embodiment of the present invention.
Figure 4:
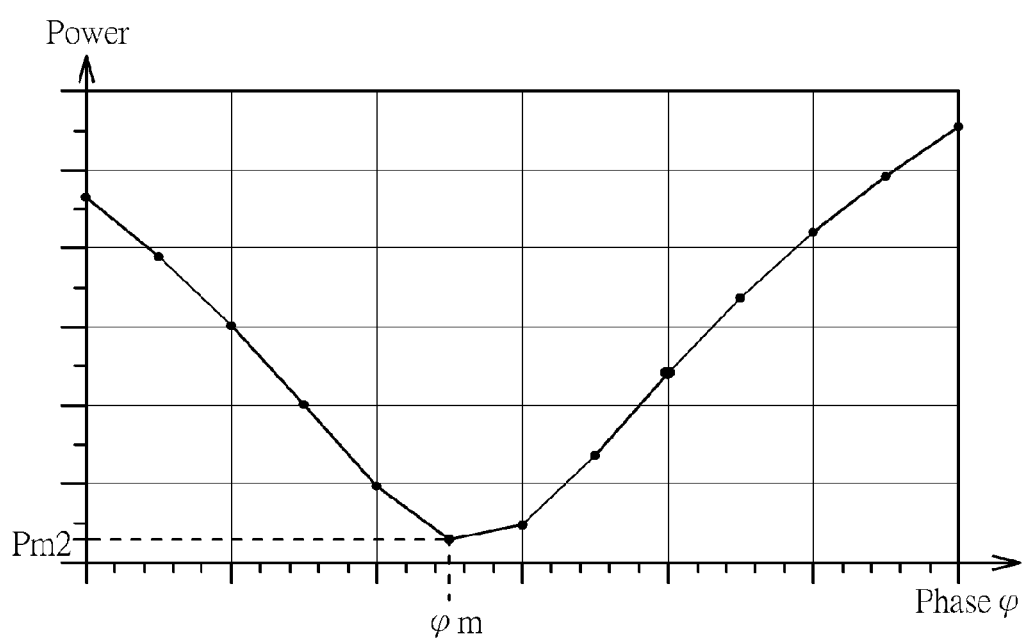

Please refer to FIG. 4, which is a diagram illustrating the power of the CIM3 signal in the amplified signal Sa' versus the predetermined coefficient range (i.e. the upper diagram) and the predetermined phase range (i.e. the lower diagram) according to an embodiment of the present invention. It can be seen that when the compensation coefficient is $\alpha m$ (i.e. the initial compensation coefficient), the CIM3 signal has the minimum power Pm1. When the compensation phase is $\phi m$ (i.e. the initial compensation phase), the CIM3 signal has the minimum power Pm2. Pm1 may different from Pm2. Therefore, when using the compensation coefficient $\alpha m$ and the compensation phase $\phi m$ to pre-distort the testing signals Sti', Stq' in step 308, if the power of the CIM3 signal is not lower than the predetermined power level, the compensation coefficient (or the compensation phase) may need to be sweep again to find another compensation coefficient such that the power of the CIM3 signal can be lower than the predetermined power level (step 314). It is noted that, in step 314, the present invention is not limited to sweep the compensation coefficient, sweeping the compensation phase also belongs to the scope of the present invention.

According to the embodiment, when the target compensation coefficient α and the target compensation phase φ are determined by the calibration process 300, the target compensation coefficient α and the target compensation phase φ may be stored in a storing circuit or a look-up table. Then, the processing device 208 may directly load the target compensation coefficient α and the target compensation phase φ to pre-distort the real data such that the power of the CIM3 signal in the transmitting signal is lower than the predetermined power level.

Briefly, the present invention pre-distorts the in-phase digital signal I and the quadrature digital signal Q by the signals derived from the above equations in the baseband process such that the power of the CIM3 signal in the transmitting signal can be diminished or at least lower than a predetermined power level.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A signal transmitting apparatus, comprising:
a first converting device, arranged to generate an up-converted in-phase signal according to an in-phase digital signal and a first pre-distortion signal;

a second converting device, arranged to generate an up-converted quadrature signal according to a quadrature digital signal and a second pre-distortion signal;

an amplifying device, arranged to generate an amplified signal according to the up-converted in-phase signal and the up-converted quadrature signal; and a processing device, arranged to generate the first pre-distortion signal at least according to a first combination signal combined by a cube of the in-phase digital signal and a multiplication of the in-phase digital signal and a square of the quadrature digital signal, and to generate the second pre-distortion signal at least according to a second combination signal combined by a cube of the quadrature digital signal and a multiplication of the quadrature digital signal and a square of the in-phase digital signal.

2. The signal transmitting apparatus of claim 1, wherein the processing device generates the first combination signal by subtracting a triple of the multiplication of the in-phase digital signal and the square of the quadrature digital signal from the cube of the in-phase digital signal, and generates the second combination signal by subtracting a triple of the multiplication of the quadrature digital signal and the square of the in-phase digital signal from the cube of the quadrature digital signal.

3. The signal transmitting apparatus of claim 2, wherein the processing device further multiplies the first combination signal by a compensation coefficient to generate the first pre-distortion signal, and multiplies the second combination signal by the compensation coefficient to generate the second pre-distortion signal.

4. The signal transmitting apparatus of claim 3, wherein the processing device further shifts the first combination signal by a compensation phase to generate the first pre-distortion signal, and shifts the second combination signal by the compensation phase to generate the second pre-distortion signal.

5. The signal transmitting apparatus of claim 1, wherein the processing device comprises:
    a first computing circuit, arranged to generate a first signal term and a second signal term according to the in-phase digital signal, the quadrature digital signal, and a compensation coefficient;
    a second computing circuit, arranged to shift the first signal term by a compensation phase to generate the first pre-distortion signal;
    a third computing circuit, arranged to generate shift the second signal term by the compensation phase to generate the second pre-distortion signal;
    a first combining circuit, arranged to combine the in-phase digital signal and the first pre-distortion signal to generate a pre-distorted in-phase digital signal; and
    a second combining circuit, arranged to combine the quadrature digital signal and the second pre-distortion signal to generate a pre-distorted quadrature digital signal;
    wherein the first signal term is expressed by $\alpha(I^3-3I\cdot Q^2)$, the second signal term is expressed by $\alpha(Q^3-3Q\cdot I^2)$, wherein I is the in-phase digital signal, Q is the quadrature digital signal, and $\alpha$ is the compensation coefficient.

6. The signal transmitting apparatus of claim 5, wherein the first converting device comprises:
    a first digital-to-analog converting circuit, arranged to convert the pre-distorted in-phase digital signal into a pre-distorted in-phase analog signal; and
    a first mixing circuit, arranged to up-convert the pre-distorted in-phase analog signal into the up-converted in-phase signal; and
the second converting device comprises:
    a second digital-to-analog converting circuit, arranged to convert the pre-distorted quadrature digital signal into a pre-distorted quadrature analog signal; and
    a second mixing circuit, arranged to up-convert the pre-distorted quadrature analog signal into the up-converted quadrature signal; and
the signal transmitting apparatus further comprises:
    a third combining circuit, arranged to combine the up-converted in-phase signal and the up-converted quadrature signal into an up-converted signal;
    wherein the amplifying device generates the amplified signal according to the up-converted signal.

7. The signal transmitting apparatus of claim 5, wherein the processing device further comprises:
    a storing circuit, arranged to store the compensation coefficient and the compensation phase.

8. The signal transmitting apparatus of claim 5, further comprising:
    a first training device, arranged to control the first computing circuit to sweep the compensation coefficient by a predetermined coefficient range to accordingly generate the amplified signal;
    a detecting device, arranged to detect a power of a counter inter-modulation signal in the amplified signal;
    a determining device, arranged to determine a specific coefficient from the predetermined coefficient range, wherein the specific coefficient corresponds to a specific power of the counter inter-modulation signal in the amplified signal.

9. The signal transmitting apparatus of claim 8, wherein the specific power is a power lower than a threshold power.

10. The signal transmitting apparatus of claim 8, wherein the determining device further sets the specific coefficient to be the compensation coefficient.

11. The signal transmitting apparatus of claim 8, further comprising:
    a second training device, arranged to control the second computing circuit to sweep the compensation phase by a predetermined phase range to accordingly generate the amplified signal;
    wherein the determining device is arranged to further determine a specific phase from the predetermined phase range, and the specific phase corresponds to the specific power of the counter inter-modulation signal in the amplified signal.

12. The signal transmitting apparatus of claim 11, wherein the determining device further sets the specific phase to be the compensation phase.

13. The signal transmitting apparatus of claim 5, further comprising:
    a training device, arranged to control the second computing circuit to sweep the compensation phase by a predetermined phase range to accordingly generate the amplified signal;
    a detecting device, arranged to detect a power of a counter inter-modulation signal in the amplified signal;
    a determining device, arranged to determine a specific phase from the predetermined phase range, wherein the specific phase corresponds to a specific power of the counter inter-modulation signal in the amplified signal.

14. The signal transmitting apparatus of claim 13, wherein the specific power is a power lower than a threshold power.

15. The signal transmitting apparatus of claim 13, wherein the determining device further sets the specific phase to be the compensation phase.

16. The signal transmitting apparatus of claim 5, further comprising:
a training device, arranged to generate the in-phase digital signal and the quadrature digital signal.

17. The signal transmitting apparatus of claim 16, wherein the in-phase digital signal and the quadrature digital signal are one-tone signal or a modulation signal.

18. A signal transmitting method, comprising:
generating an up-converted in-phase signal according to an in-phase digital signal and a first pre-distortion signal;
generating an up-converted quadrature signal according to a quadrature digital signal and a second pre-distortion signal;
generating an amplified signal according to the up-converted in-phase signal and the up-converted quadrature signal;
generating the first pre-distortion signal at least according to a first combination signal combined by a cube of the in-phase digital signal and a multiplication of the in-phase digital signal and a square of the quadrature digital signal; and
generating the second pre-distortion signal at least according to a second combination signal combined by a cube of the quadrature digital signal and a multiplication of the quadrature digital signal and a square of the in-phase digital signal.

19. The signal transmitting method of claim 18, wherein the step of generating the first pre-distortion signal at least according to the first combination signal further comprises:
generating the first combination signal by subtracting a triple of the multiplication of the in-phase digital signal and the square of the quadrature digital signal from the cube of the in-phase digital signal; and
the step of generating the second pre-distortion signal at least according to the second combination signal further comprises:
generating the second pre-distortion signal by subtracting a triple of the multiplication of the quadrature digital signal and the square of the in-phase digital signal from the cube of the quadrature digital signal.

20. The signal transmitting method of claim 19, wherein the step of generating the first pre-distortion signal at least according to the first combination signal further comprises:
multiplying the first combination signal by a compensation coefficient to generate the first pre-distortion signal; and
the step of generating the second pre-distortion signal at least according to the second combination signal further comprises:
multiplying the second combination signal by the compensation coefficient to generate the second pre-distortion signal.

21. The signal transmitting method of claim 20, wherein the step of generating the first pre-distortion signal at least according to the first combination signal further comprises:
shifting the first combination signal by a compensation phase to generate the first pre-distortion signal; and
the step of generating the second pre-distortion signal at least according to the second combination signal further comprises:
shifting the second combination signal by the compensation phase to generate the second pre-distortion signal.

22. The signal transmitting method of claim 18, wherein the step of generating the first pre-distortion signal and the second pre-distortion signal comprises:
generating a first signal term and a second signal term according to the in-phase digital signal, the quadrature digital signal, and a compensation coefficient;
shifting the first signal term by a compensation phase to generate the first pre-distortion signal;
shifting the second signal term by the compensation phase to generate the second pre-distortion signal;
combining the in-phase digital signal and the first pre-distortion signal to generate a pre-distorted in-phase digital signal; and
combining the quadrature digital signal and the second pre-distortion signal to generate a pre-distorted quadrature digital signal;
wherein the first signal term is expressed by $\alpha(I^3-3I\cdot Q^2)$, the second signal term is expressed by $\alpha(Q^3-3Q\cdot I^2)$, wherein I is the in-phase digital signal, Q is the quadrature digital signal, and $\alpha$ is the compensation coefficient.

23. The signal transmitting method of claim 22, wherein the step of generating the up-converted in-phase signal comprises:
converting the pre-distorted in-phase digital signal into a pre-distorted in-phase analog signal; and
up-converting the pre-distorted in-phase analog signal into the up-converted in-phase signal; and
the step of generating the up-converted quadrature signal comprises:
converting the pre-distorted quadrature digital signal into a pre-distorted quadrature analog signal; and
up-converting the pre-distorted quadrature analog signal into the up-converted quadrature signal; and
the signal transmitting method further comprises:
combining the up-converted in-phase signal and the up-converted quadrature signal into an up-converted signal;
wherein the amplified signal is generated by amplifying the up-converted signal.

24. The signal transmitting method of claim 22, further comprising:
storing the compensation coefficient and the compensation phase.

25. The signal transmitting method of claim 22, further comprising:
sweeping the compensation coefficient by a predetermined coefficient range to accordingly generate the amplified signal;
detecting a power of a counter inter-modulation signal in the amplified signal;
determining a specific coefficient from the predetermined coefficient range, wherein the specific coefficient corresponds to a specific power of the counter inter-modulation signal in the amplified signal.

26. The signal transmitting method of claim 25, wherein the specific power is a power lower than a threshold power.

27. The signal transmitting method of claim 25, further comprising:
setting the specific coefficient to be the compensation coefficient.

28. The signal transmitting method of claim 25, further comprising:
sweeping the compensation phase by a predetermined phase range to accordingly generate the amplified signal; and determining a specific phase from the predetermined phase range, and the specific phase corresponds to the specific power of the counter inter-modulation signal in the amplified signal.

29. The signal transmitting method of claim 28, further comprising:
setting the specific phase to be the compensation phase.

30. The signal transmitting method of claim 22, further comprising:
sweeping the compensation phase by a predetermined phase range to accordingly generate the amplified signal;
detecting a power of a counter inter-modulation signal in the amplified signal;
determining a specific phase from the predetermined phase range, wherein the specific phase corresponds to a specific power of the counter inter-modulation signal in the amplified signal.

31. The signal transmitting method of claim 30, wherein the specific power is a power lower than a threshold power.

32. The signal transmitting method of claim 30, further comprising:
setting the specific phase to be the compensation phase.

33. The signal transmitting method of claim 22, further comprising:
generating the in-phase digital signal and the quadrature digital signal.

34. The signal transmitting method of claim 33, wherein the in-phase digital signal and the quadrature digital signal are one-tone signal or a modulation signal.

* * * * *